United States Patent

[11] 3,565,234

| [72] | Inventor | Troy W. Birdsong<br>St. Louis, Mo. |
|---|---|---|
| [21] | Appl. No. | 767,290 |
| [22] | Filed | Oct. 14, 1968 |
| [45] | Patented | Feb. 23, 1971 |
| [73] | Assignees | Elbie B. Birdsong<br>fractional part interest to each;<br>Ronald W. Birdsong<br>St. Louis County, Mo., fractional part interest to each |

[54] APPARATUS FOR UNSCRAMBLING CANS WITH FERROMAGNETIC BOTTOMS
10 Claims, 7 Drawing Figs.

[52] U.S. Cl. .................................................. 198/33;
198/41; 221/212
[51] Int. Cl. .................................................. B23q 7/04,
B65g 17/46, B65g 47/24
[50] Field of Search .......................................... 198/33, 33
(R4), 35, 41, 53, 54, 131, 220 (A10), (Digest), (Mag); 221/212

[56] References Cited
UNITED STATES PATENTS

| 2,910,165 | 10/1959 | Byington | 198/30 |
|---|---|---|---|
| 2,916,133 | 12/1959 | Copping | 198/30 |

OTHER REFERENCES
"Guide to Magnetic Conveying & Handling" by Bunting Magnetics Company— — 4 of 8 pages are copied Primary Examiner—Edward A. Sroka
Attorney—Koenig, Senniger, Powers and Leevitt ABSTRACT: A can unscrambler for unscrambling and feeding cans which have ferromagnetic bottoms and nonmagnetic sides to a delivery station in erect condition. The unscrambler comprises a bin for holding a jumbled supply of cans and a driven endless belt conveyor with reaches running along the bottom of the bin, curving upward out of the bin, extending back over the bin to a magnetic roll, extending overhead from the latter to the delivery station, and returning to the bin. Magnets are provided adjacent the belt reaches on the side of the belt opposite from the cans for magnetically attracting the can bottoms against the belt so that they are delivered by the belt to the delivery station in erect condition.

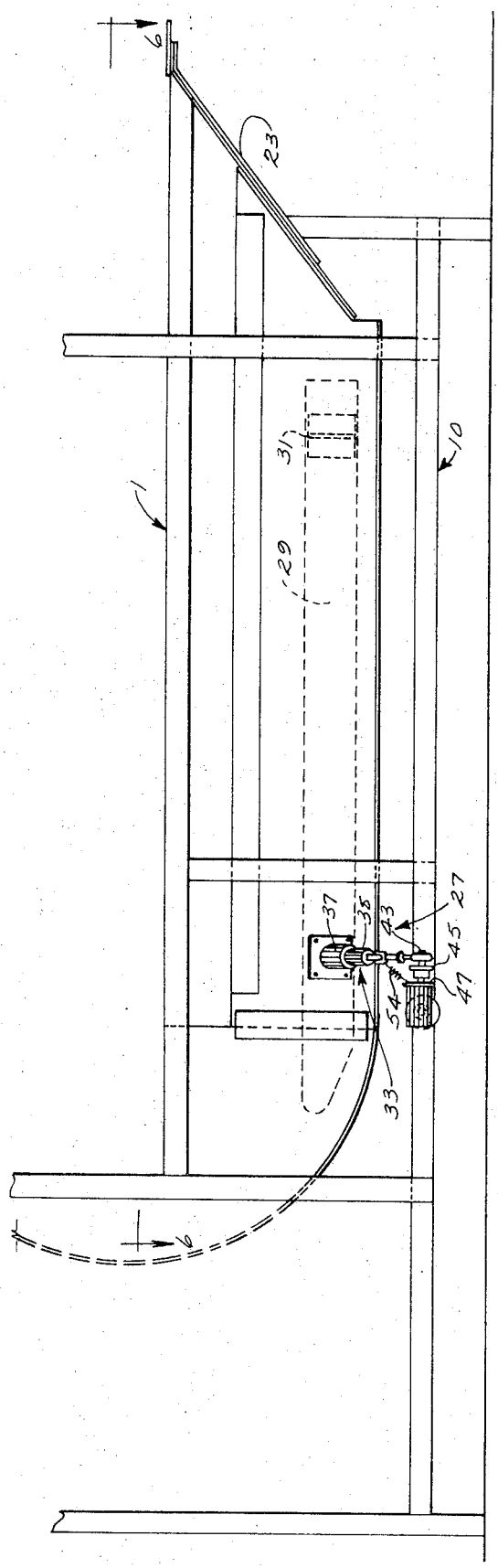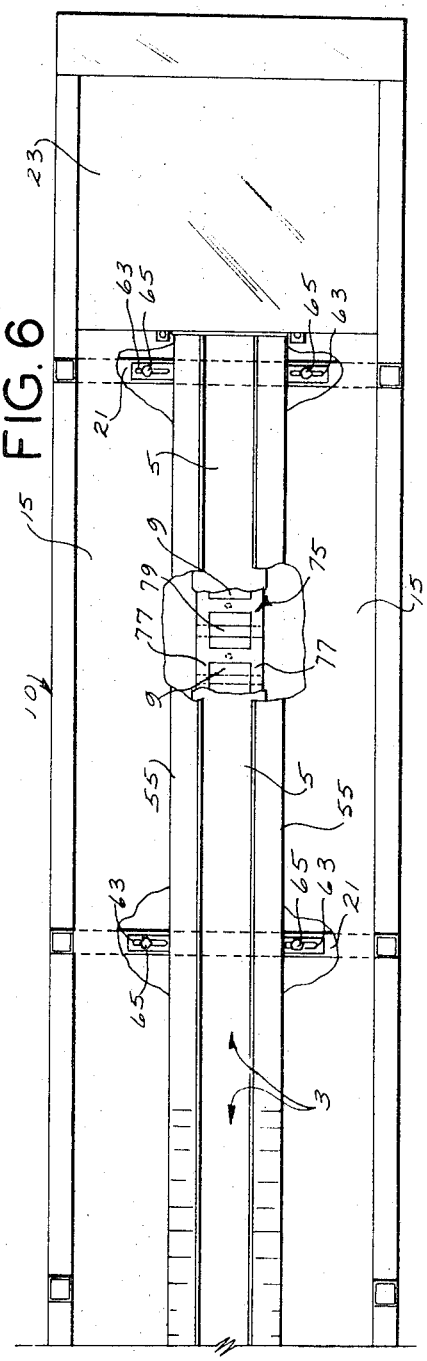
FIG. 3
FIG. 6

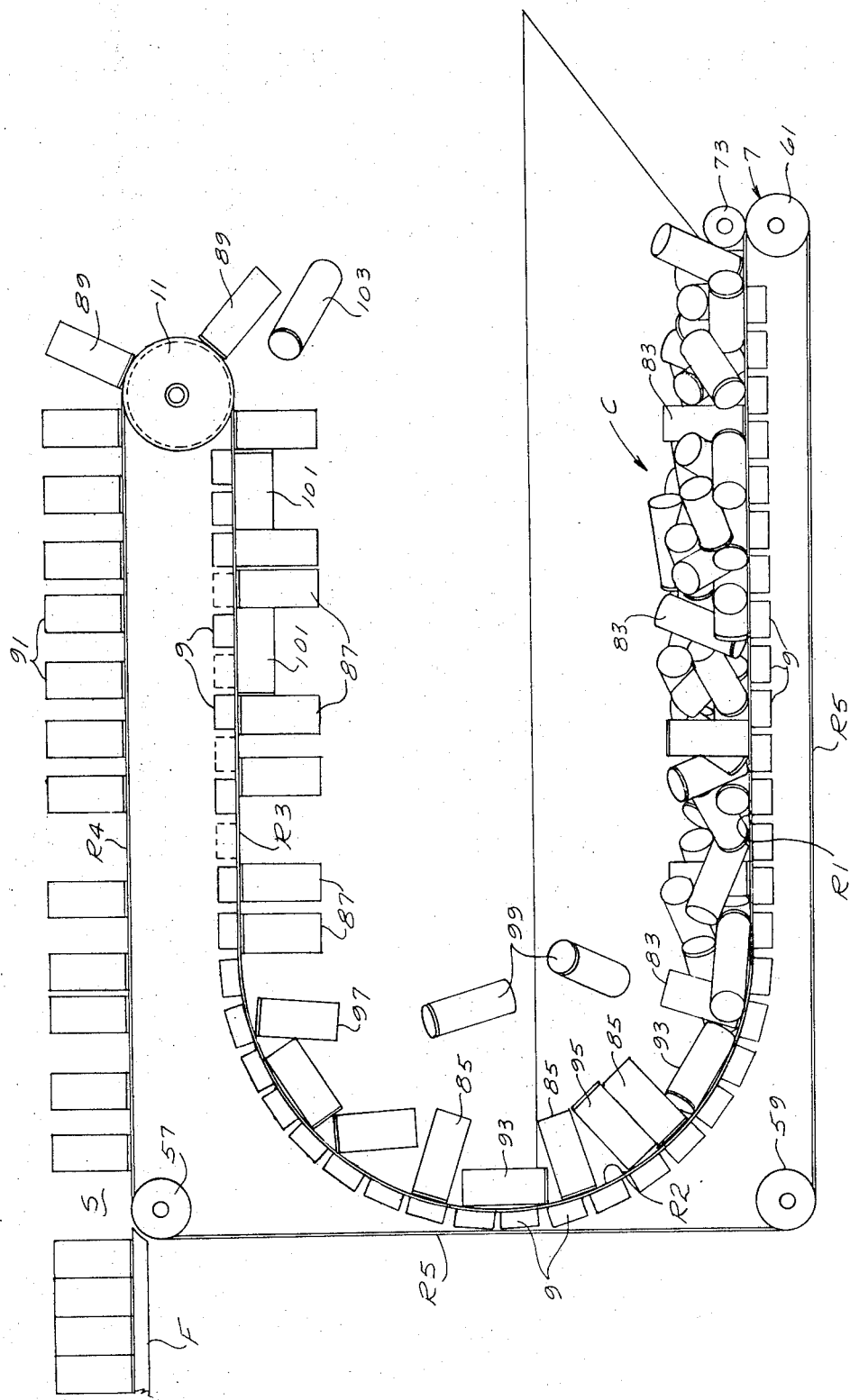

000
APPARATUS FOR UNSCRAMBLING CANS WITH FERROMAGNETIC BOTTOMS

BACKGROUND OF THE INVENTION

The invention is in the field of apparatus and methods for unscrambling a jumbled assortment of empty cans having ferromagnetic bottoms and nonmagnetic sides and feeding them in erect condition to filling machinery or the like.

Cans of this type are used in a variety of kinds of canning or filling operations, e.g., in the packaging of readymade biscuits. Such cans usually have plated steel bottoms and fiber sides. In these canning or filling operations it is necessary that empty cans be delivered to the filling machinery in erect condition. In large filling operations, cans are often conveyed directly from a can manufacturing operation by a conveyor belt to the facilities of the filler. But in smaller operations, the cans are separately purchased and then fed to the filling machinery. For reasons of economy it is often desired to purchase cans in economical jumbled bulk lots, to facilitate storage and handling of the cans. Thus, some means must be provided for unscrambling the jumbled cans and feeding them to the filling apparatus. Heretofore, in small can filling operations, this has been done manually. That is, cans are typically manually erected and placed on a conveyor belt. Since this is often not economically practical, in such operations there is a need for apparatus which will economically unscramble the jumbled supply of cans and deliver them in erect condition to the filling operation. Heretofore, there has not been available such economical and uncomplicated apparatus for unscrambling and delivering to a delivery station in erect condition large numbers of cans of the type which have metal bottoms and nonmetal sides, e.g., sides of fiber or plastic materials.

SUMMARY OF THE INVENTION

Among the several objects of the invention may be noted the provision of apparatus for unscrambling and feeding to a delivery station in erect condition large numbers (i.e., hundreds of cans per minute) of scrambled cans having ferromagnetic bottoms and nonmagnetic sides; the provision of such an apparatus which is relatively simple and inexpensive; the provision of such apparatus which is adjustable to unscramble various sizes of cans; the provision of such apparatus which is adjustable to vary both the lineal speed and the density of cans delivered; the provision of such apparatus which is not prone to clog or jam; the provision of such apparatus which does not have to be frequently filled or supervised; and the provision of such apparatus which is dependable and trouble free in operation.

Briefly, the can unscrambler of this invention has a bin for holding the jumbled supply of cans with ferromagnetic bottoms. A continuously driven endless belt conveyor is guided by guide means so that it has a first reach traveling along the bottom of the bin. A second reach extends upward out of the bin to a third reach which extends back over the bin. A fourth reach travels above the third reach to a delivery station. Finally, a return reach extends to the first reach. Means is provided for effecting magnetic attraction of the bottoms of the cans to hold them against the conveyor along the path of the belt from the bin throughout the second and third reaches and around to the fourth reach. The can bottoms are thus attracted to the conveyor from the bin supply so that the cans are either oriented in erect position with respect to the belt as they leave the bin, or they assume erect position as they travel along the second or third reaches, or fall into the bin. The cans are thereby fed to the delivery station in erect position.

Other objects and features will be in part apparent and in part pointed out hereinafter.

BRIEF DESCRIPTION OF THE DRAWINGS

FIG. 3 is an end view of a shaker mechanism of the can bin of the unscrambler taken from the right-hand end of the view of FIG. 2;

FIG. 6 is a longitudinal section taken on the line 6—6 of FIG. 3 illustrating details of the bin and belt conveyor of the apparatus, parts of the bin and belt conveyor being broken away to show details of conveyor guide rails and other features; and FIG. 7 is a simplified schematic view showing operation of the can unscrambler apparatus.

Corresponding reference characters indicate corresponding parts throughout the several views of the drawings.

DESCRIPTION OF THE PREFERRED EMBODIMENT

Figure 1:
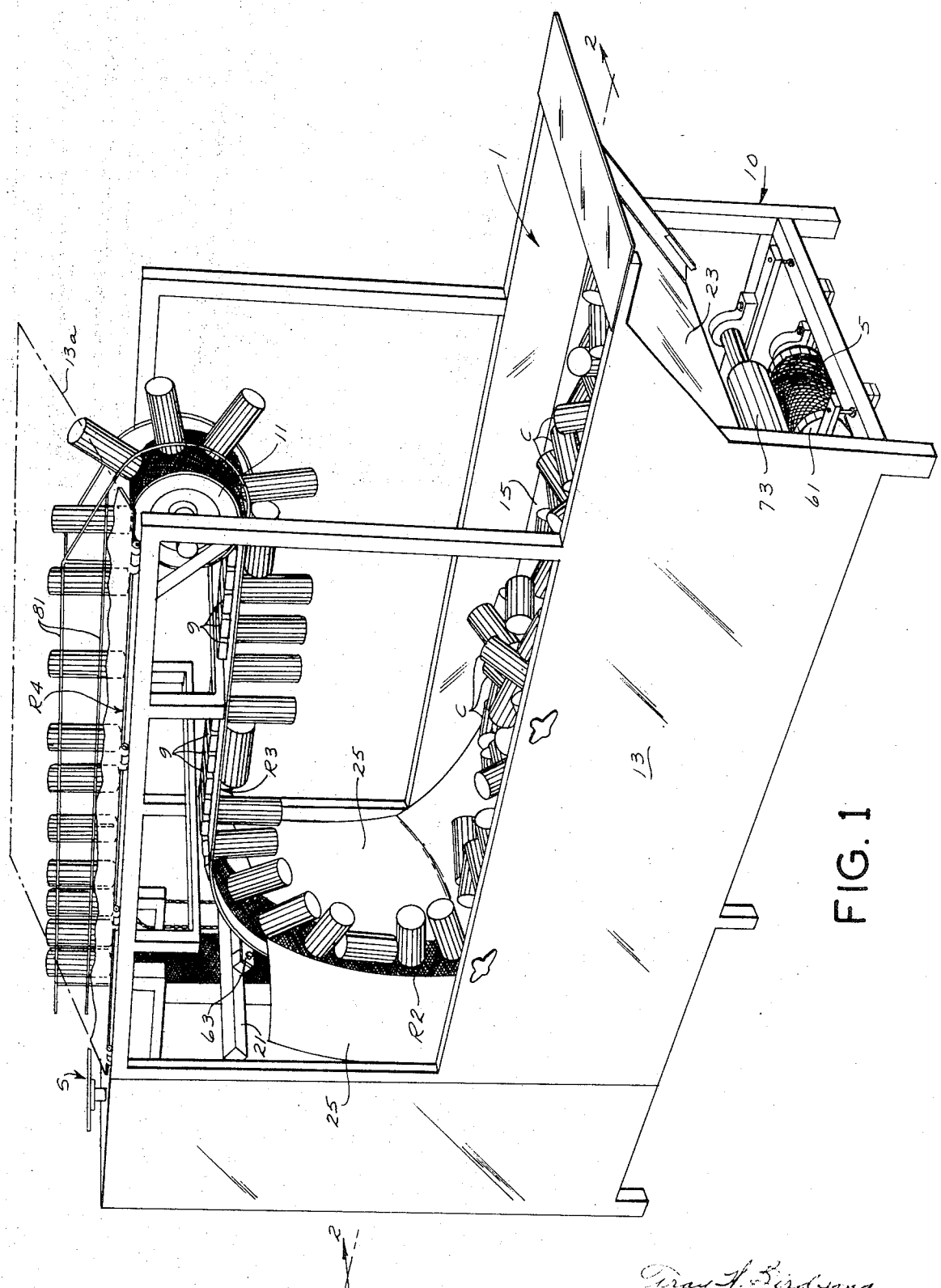
FIG. 1 is a perspective view of can unscrambler apparatus of this invention with certain portions of the construction being broken away for clarity of illustration.

Referring to the drawings, a can unscrambler constructed in accordance with this invention is shown to comprise a bin 1 for holding a jumbled supply of cans C. These cans have ferromagnetic bottoms and nonmagnetic sides. The bin has a longitudinally extending bottom opening or slot 3. An endless belt conveyor 5 is guided for travel in a path having a first reach R1 traveling forward along the bottom of the bin below the slot 3, a second reach R2 traveling on the outside of the forward end of the bin and extending upward out of the bin, a third reach R3 traveling back over the bin, a fourth reach R4 traveling forward over the third reach to a delivery station S, and a return reach R5 extending down to the first reach R1. Means such as indicated at 7 is provided for continuously driving the belt. Means is provided for effecting magnetic attraction of the bottoms of cans to hold them against the belt starting at the bin and along the path of the belt from the bin throughout the second and third reaches and around to the fourth reach. This means comprises a series of magnets 9 spaced along the path of the belt throughout its first, second and third reaches, and a magnetic roll 11 around which the belt travels from the third to the fourth reach. The magnets 9 effect attraction of can bottoms to the belt 5 as the belt travels along the bottom of the bin. As the attracted cans, traveling with the belt, exit from the bin, some will be oriented in erect position with respect to the belt. Others, which are not so oriented on exit from the bin will either assume erect position with respect to the belt as they travel with the belt through its second and third reaches, or they will fall back into the bin.

More particularly, the unscrambler comprises a frame generally designated 10 in which the bin is mounted. The bin 1 is mounted between lower sidewalls 13 of the frame. Upper sidewalls such as indicated at 13a may be provided, hinged or otherwise openable for access to the interior of the frame. The bin itself is troughlike in cross section, comprising inclined sidewalls 15 sloping inwardly and downwardly toward one another with their lower edges laterally spaced to provide the opening or slot 3 extending longitudinally of the bottom of the bin. The bin walls 15 are secured at their upper margins to angle members 17 on the inside of the frame sidewalls, and are secured adjacent their lower edges to supports 19 mounted on cross frame members 21. At one end of the bin, which may be referred to as its rearward or loading end, is an inclined end wall 23. At the other end of the bin, the walls 15 are compoundly curved to extend upward to form a forward end wall 25 extending about the bin proper, the opening or slot 3 continuing upward throughout the extent of wall 25. The bin walls may be advantageously formed of fiber glass, although other materials are, of course, suitable.

Figure 4:
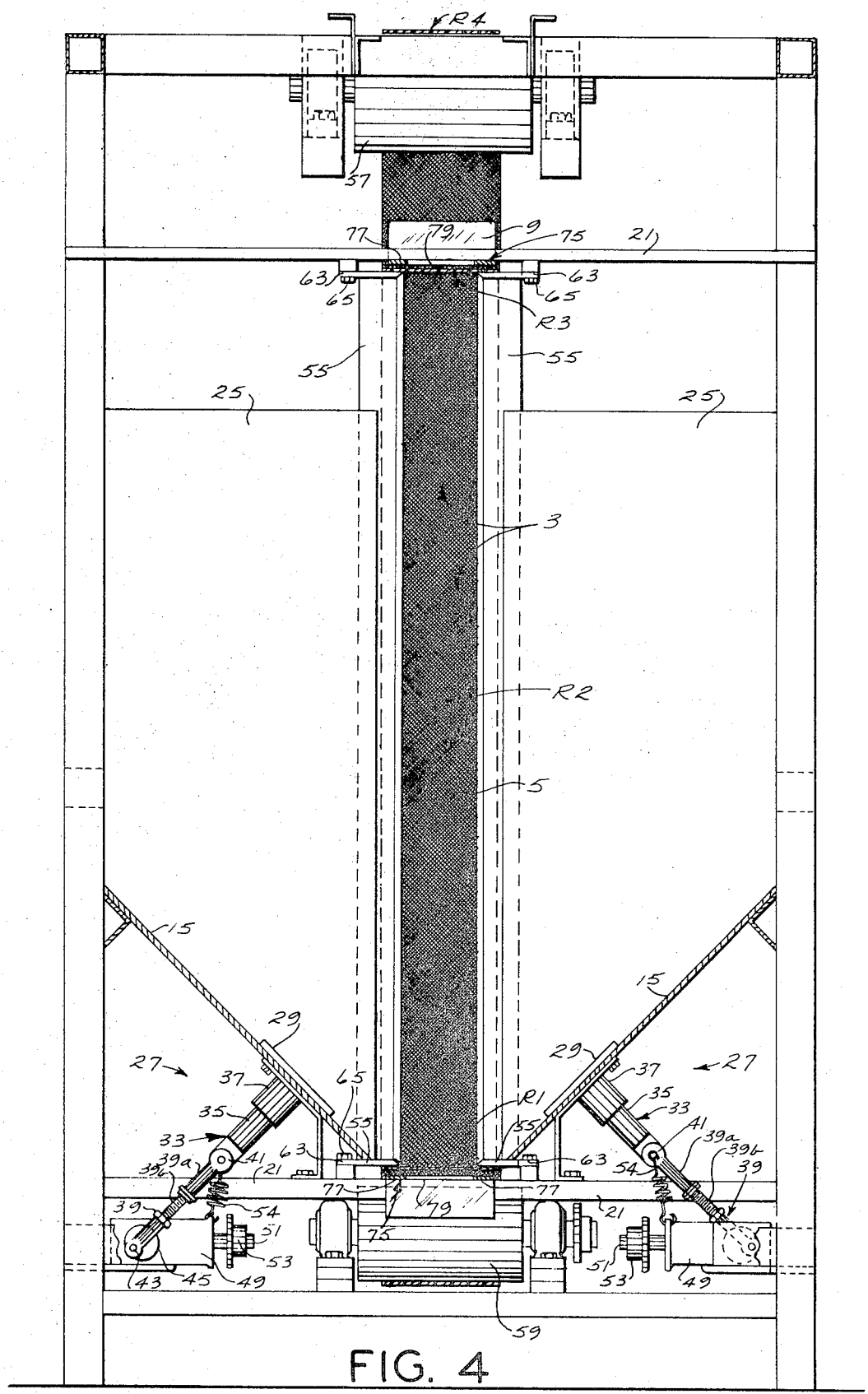
FIG. 4 is a transverse section taken on line 4—4 of FIG. 2, showing details of the shaker mechanism.
Figure 5:
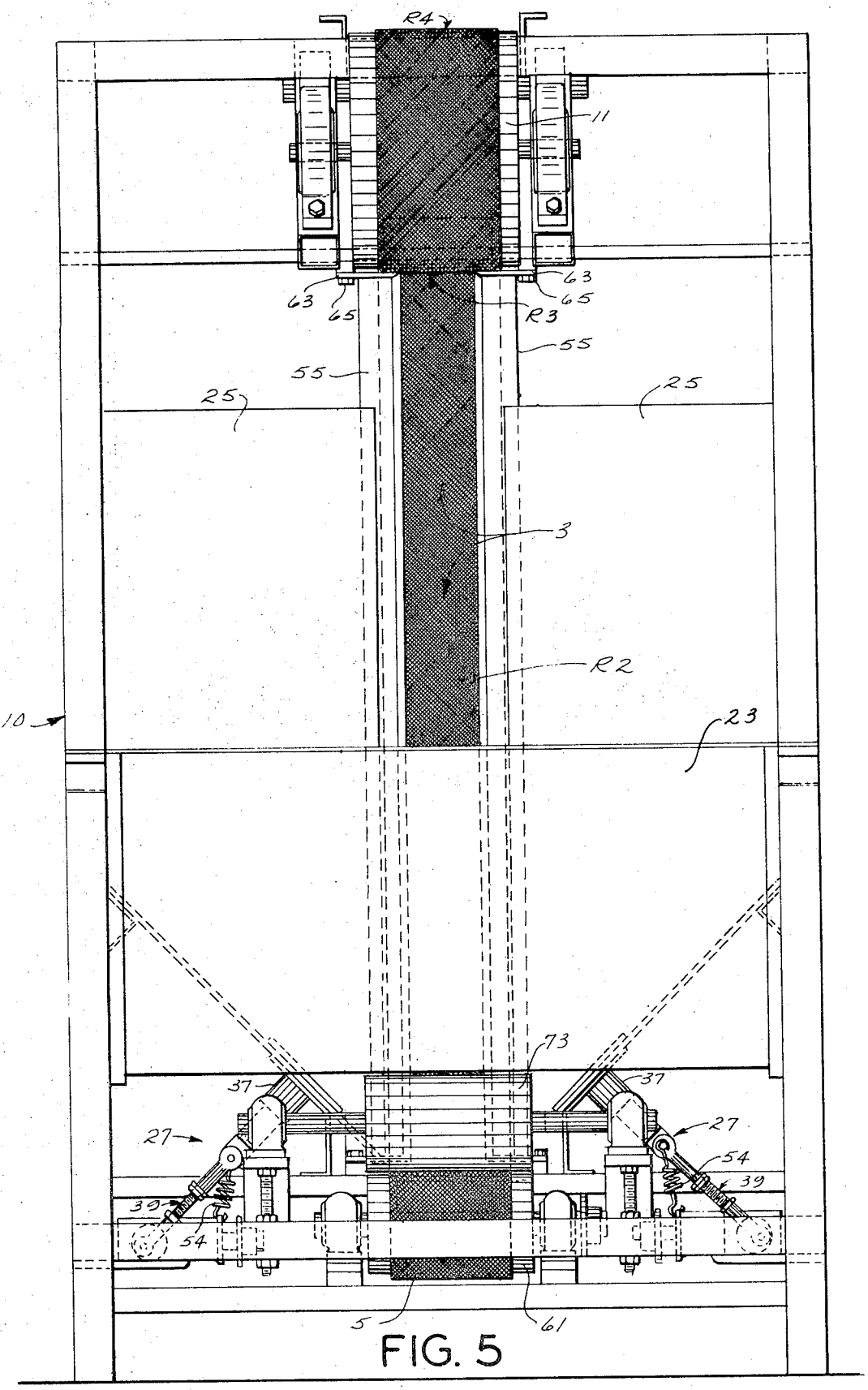
FIG. 5 is a side view illustrating parts of the shaker mechanism, certain parts of the unscrambler being omitted for clarity of illustration.

Means indicated generally at 27 is provided for agitating or shaking cans in the bin. As shown in FIGS. 4 and 5, this means comprises a pair of shaker plates 29, each pivoted at one end thereof as indicated at 31, as by means of a hinge on the inside of a respective bin wall 15 adjacent the rearward end of the bin, and means 33 adjacent the forward end of the bin for oscillating each shaker plate. The oscillating means 33 for each shaker plate comprises a rod 35 secured to the shaker plate extending through a tubular guide 37 mounted on the bin wall, and an adjustable length link 39 pin connected at 41 to the rod and connected to a crank pin 43 on a disc 45 on the output shaft 47 of a right-angle drive 49. The adjustable length link 39 comprises a cylindrical portion 39a including a drilled recess and an adjustable portion 39b extending into the recess of portion 39a providing a sliding fit between the two portions. The input shaft 51 of this drive carries a sprocket 53 driven in a manner to be hereinafter described. A tension spring 54 is connected between the pin connection 41 and the housing of drive 49. The arrangement is such that on rotation of the disc 45 the shaker plate 29 is oscillated on the pivot at 31, the spring 54 providing for relief if a can or other obstruction should lodge under the shaker plate. That is, spring 54 normally biases the portions 39a and 39b of link 39 toward each other but stretches to permit elongation of link 39 in the event of obstruction of a shaker plate.

The belt 5 is guided in its above-stated path of travel by a pair of guide rails 55 for the side margins of the conveyor and by rolls 57, 59, 61 and the magnetic roll 11. The rails 55 are constituted by flat strips mounted to extend underneath the lower edges of the bin sidewalls, up around the forward end wall 25 of the bin, and then back over the bin to the roll 11. The rails have beveled inner edges which are spaced-apart throughout the length of the rails to provide the slot 3 and a continuation of the slot around and back to the roll 11. The rails have slotted tabs 63 receiving bolts 65 by means of which the rails are adjustably secured to cross frame members 21, in such manner that the rails may be laterally adjusted to vary the width of the slot 3 according to the diameter of cans to be handled.

Figure 2:
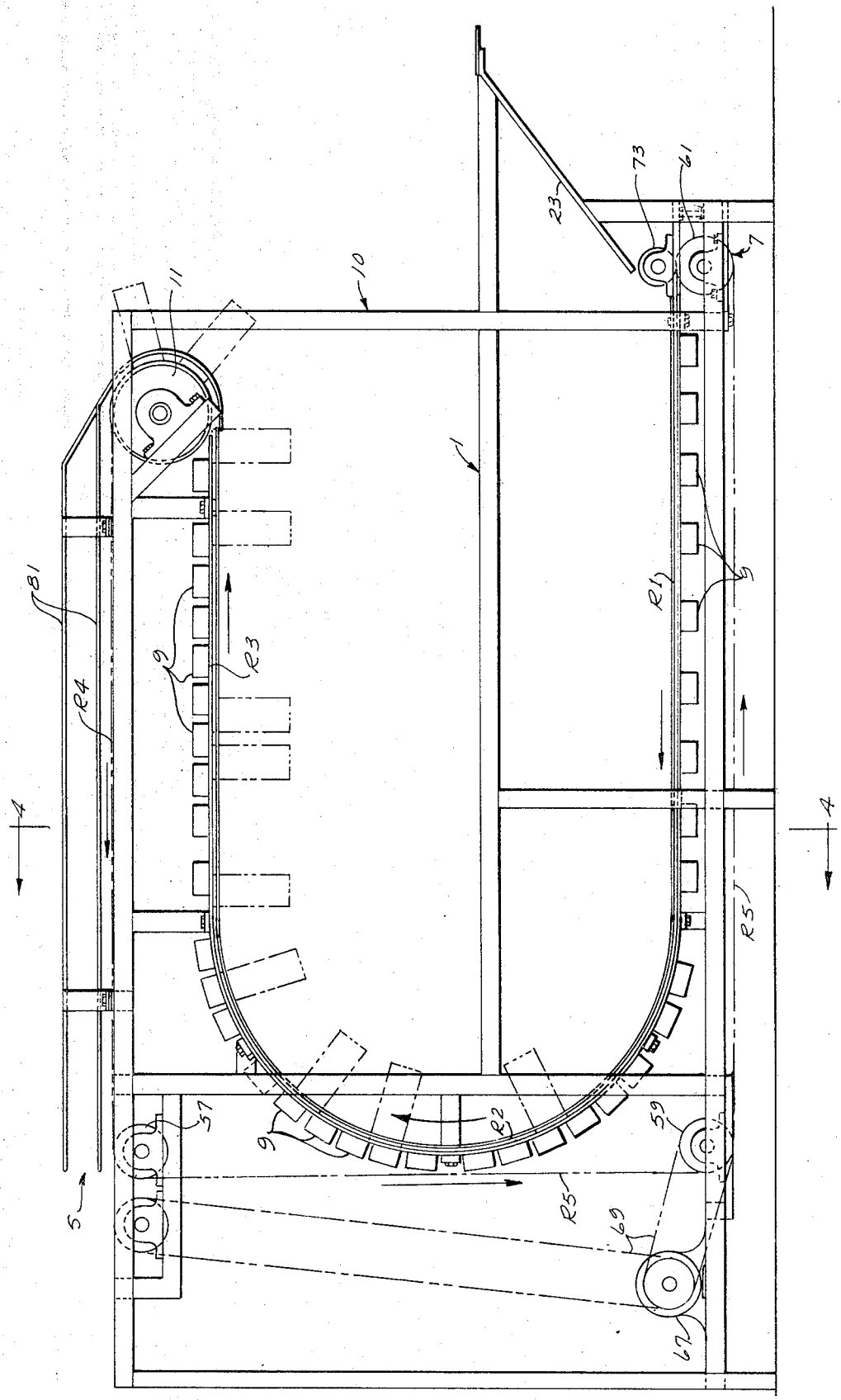
FIG. 2 is a longitudinal section of the unscrambler apparatus taken on line 2—2 of FIG. 1.

The belt 5 is adapted to be continuously driven in the direction indicated by the arrows in FIG. 2 by a motorized variable-speed drive 67 via a chain and sprocket drive 69, with a chain drive connection therefrom to the shaker mechanism sprockets 53. A pinch roll 73 may be used in conjunction with guide roll 61.

The magnets 9 are mounted at longitudinally spaced intervals on a ferromagnetic (e.g., steel) rail 75 having side bars 77 and crossbars 79. This rail in effect provides pole pieces for the magnets to establish a magnetic field through the belt magnetically to attract can bottoms to the belt. The magnet rail 75 is secured to cross frame members 21, and extends on the outside of rails 55 along the bottom of the bin and continues on up around the forward end wall 25 of the bin and back over the bin to the magnetic roll 11. The belt travels between the magnet rail 75 and the rails 55, the magnets being removably mounted, as by screws, on what is in effect the outside of the rails. This removable mounting of the magnets is important in that it enables some of the magnets which extend along the third reach R3 of the belt over the bin to be removed (as indicated by the dashed lines in FIG. 7) to vary the spacing of the cans along the length of the belt. This occurs because of the drop in the intensity of the magnetic field across the belt where magnets are removed, permitting some of the cans to fall back into the bin for increasing the spacing of cans delivered by the belt. The magnets along the third reach R3 may even by left unsecured to the magnet rail structure 75 to make them more readily removable. Side rails 81 may be provided along the fourth reach R4 of the belt.

In the operation of the can unscrambler apparatus of this invention, the apparatus is positioned adjacent the conveyor of filling machinery, shown at F in FIG. 7 or other apparatus to which erect, unscrambled cans are to be supplied.

A supply of jumbled cans C of the type described, i.e., with ferromagnetic bottoms, is dumped into the bin 1 of the unscrambler. The belt is driven at a suitable speed by the variable speed motor 67 so that the first reach R1 of the belt travels along the bottom of the bin from the right to the left as shown by arrows in FIG. 2.

The magnets 9 located adjacent the bin reach of the belt, i.e., the first reach R1, establish a magnetic field across the belt. The bottoms of the cans, being ferromagnetic, have a magnetic permeability considerably greater than unity, hence are magnetically attracted toward reach R1 which is moving beneath the jumbled supply of cans. Referring to FIG. 7, it will be seen that some of the cans of the bin supply, such as designated at 83, are attracted toward the belt so that they are essentially erect with respect to the belt with their bottoms held against it.

Because the magnets 9 are located adjacent the belt throughout the second and third reaches R2, R3, as well, the cans are then carried upward from the jumbled supply while being magnetically attracted against the belt along these reaches. A number of the cans, such as those shown at 85, are thus magnetically carried upward along belt reach R2 through a horizontal position. The cans, now shown at 87, are then carried back over the bin supply of jumbled cans in inverted position as they travel along reach R3.

Since the roll 11 is a magnetic roll, the can bottoms are magnetically attracted against the belt as it passes over roll 11. Accordingly, the cans, such as cans 89, are carried upward through a horizontal position and around to an upright position for delivery by the fourth reach R4 of the conveyor to the delivery station at S. Cans traveling along the fourth reach R4 are designated 91.

Some of the cans are not oriented in erect position with respect to the conveyor belt as they leave the supply. For example, some of the cans, such as cans 93, are carried upward with their sides against the belt. Others, such as can 95, are carried upward with their open ends against the belt by engagement with other cans. The nonerect cans such as those at 93 and 95 either swing from an edge of their bottoms (such as cans 97) to assume erect position as they are carried upward from the supply and back over the bin, or they fall back into the supply (such as cans 99). Occasionally, some of the cans may be prevented from assuming an erect position because they are wedged between adjacent cans. Such cans are shown at 101. However, when the adjacent cans diverge while traveling around roll 11, the wedged cans (such as can 103) are freed and fall into the bin supply.

If the spacing of the erected cans is greater than desired so that there is too little spacing between adjacent cans, a number of the magnets 9 adjacent the third reach R3 of the belt may be removed so that fewer cans will be supported. Magnets which have been removed are represented by dashed lines in FIG. 7. This provides a convenient adjustment to vary can spacing and the number of cans delivered per unit of time. This is especially desirable where the cans are small or light in weight so that a large number are initially attracted toward the belt. In addition, by changing the speed of the conveyor drive motor 67, the lineal or traveling speed of the erected cans delivered to the delivery station S may be varied to match the speed or capacity of the filling machinery conveyor shown at F. Thus, both the lineal speed of the cans and the spacing of cans delivered may be separately varied.

The attraction of the cans C of the bin supply toward the bin reach R1 of the belt is enhanced by the agitation of the cans by the shaker plates 29, the shaker plates keeping the cans from clogging or jamming. If an obstruction of the shaker plates occurs so as to restrict their movement, as where a can or other object lodges between one of the shaker plates and a bin wall, damage is prevented by the relief spring 54 which permits elongation of link 39 of the shaker plate reciprocating mechanism 33.

It will thus be seen that the relative simplicity of the present apparatus and method provides for a high degree of dependability and freedom from trouble. In addition, the generous size of the can bin 1 provides an unscrambler that need not be frequently filled. Accordingly, no close supervision of the apparatus is required, providing for economy of operation.

As will be readily apparent to those skilled in the art, the present apparatus readily lends itself to the use of electromagnets in place of the fixed permanent magnets 9. This would permit the magnetic field to be varied along the various reaches as desired by simple electrical switching or variation of the magnet coil current.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Apparatus for feeding cans with ferromagnetic bottoms from a jumbled supply to a delivery station with the cans in erect position at the delivery station comprising:
   a bin for holding a jumbled supply of the cans;
   an endless belt conveyor;
   means guiding the conveyor to have a first reach traveling along the bottom of the bin, a second reach extending upward out of the bin, a third reach extending back over the bin, a fourth reach traveling above the third reach to the delivery station, and a return reach to the first reach;
   means for continuously driving the conveyor;
   and means for effecting magnetic attraction of the bottoms of the cans to hold them against the conveyor along the path of the conveyor from the bin throughout the second and third reaches and around to the fourth reach, whereby the can bottoms are attracted to the conveyor from the bin supply so that cans are either oriented in erect position with respect to the conveyor as they leave the bin, or assume erect position as they travel along the second or third reaches, or fall into the bin.

2. Apparatus as set forth in claim 1 wherein the bin has sidewalls inclined downward toward one another with their lower edges spaced apart to provide an opening extending longitudinally of the bottom of the bin, the first reach of the conveyor traveling along this opening.

3. Apparatus as set forth in claim 2 wherein the walls of the bin are curved upward at one end of the bin constituting its forward end where the cans carried by the conveyor exit from the bin, the second reach of the conveyor traveling upward on the outside of said forward end of the bin and said opening continuing upward in said forward end.

4. Apparatus as set forth in claim 3 wherein said guiding means includes guide rails for the side margins of the conveyor guiding it in said second and third reaches of the conveyor.

5. Apparatus as set forth in claim 4 wherein guide rails are laterally adjustable for varying the width of said opening.

6. Apparatus as set forth in claim 5 wherein the guide rails also extend along the first reach of the conveyor.

7. Apparatus as set forth in claim 1 wherein the means for effecting magnetic attraction of bottoms of the cans comprises a series of magnets extending along the first, second and third reaches of the conveyor on the outside of these reaches and a magnetic roll around which the conveyor travels from the third to the fourth reach.

8. Apparatus as set forth in claim 7 wherein magnets are removable from the series along the third reach to vary the spacing of cans fed by the conveyor to the delivery station.

9. Apparatus as set forth in claim 2 wherein the sidewalls of the bin include shaker means.

10. Apparatus as set forth in claim 9 wherein the shaker means comprises shaker plates and means for oscillating the shaker plates.